United States Patent
Dhanuka et al.

(10) Patent No.: US 11,030,388 B2
(45) Date of Patent: Jun. 8, 2021

(54) LIVE TEXT GLYPH MODIFICATIONS

(71) Applicant: Adobe Inc., San Jose, CA (US)

(72) Inventors: Praveen Kumar Dhanuka, Howrah (IN); Sanjeev Kumar Biswas, Bangalore (IN); Neeraj Nandkeolyar, Ghaziabad (IN)

(73) Assignee: Adobe Inc., San Jose, CA (US)

( * ) Notice: Subject to any disclaimer, the term of this patent is extended or adjusted under 35 U.S.C. 154(b) by 24 days.

(21) Appl. No.: 16/141,433

(22) Filed: Sep. 25, 2018

(65) Prior Publication Data
US 2020/0097525 A1 Mar. 26, 2020

(51) Int. Cl.
| G06F 17/00 | (2019.01) |
| G06F 40/109 | (2020.01) |
| G06F 3/0484 | (2013.01) |
| G06F 16/583 | (2019.01) |
| G06F 40/166 | (2020.01) |
| G06F 3/0482 | (2013.01) |

(52) U.S. Cl.
CPC ........ G06F 40/109 (2020.01); G06F 3/04845 (2013.01); G06F 16/5838 (2019.01); G06F 40/166 (2020.01); G06F 3/0482 (2013.01)

(58) Field of Classification Search
CPC .. G06F 40/109; G06F 16/5838; G06F 40/166; G06F 3/04845; G06F 3/0482
USPC ......................................................... 715/269
See application file for complete search history.

(56) References Cited

U.S. PATENT DOCUMENTS

| 5,050,228 A | 9/1991 | Yoshida et al. |
| 5,155,805 A | 10/1992 | Kaasila |
| 6,288,726 B1 * | 9/2001 | Ballard ................. G06F 40/109 345/468 |
| 6,501,475 B1 | 12/2002 | Cheng |
| 6,760,029 B1 * | 7/2004 | Phinney ................. G06K 15/02 345/471 |

(Continued)

FOREIGN PATENT DOCUMENTS

WO    WO-2013097817    7/2013

OTHER PUBLICATIONS

"Pre-Interview First Office Action", U.S. Appl. No. 16/014,683, dated Aug. 15, 2019, 3 pages.

(Continued)

*Primary Examiner* — Jason T Edwards
(74) *Attorney, Agent, or Firm* — FIG. 1 Patents

(57) ABSTRACT

Live text glyph modification is described. A content processing system receives a selection input to select a glyph via a user interface of a content editing application. Responsive to this selection, the content processing system generates an outline of the glyph's geometry and enables modification of the outline relative to left-bearing, right-bearing, and baseline positions for the glyph, which define the glyph's position relative to other glyphs of the text content. Using the modified outline, the content processing system generates a modified glyph, which may be stored in a global storage resource and added to a stylistic set for the font type of the original glyph. This enables the content processing system to generate and store modified glyph geometries that can be readily interchanged with original glyph geometries during the creation of text content—without destroying the ability to edit the text content using conventional text editing tools.

20 Claims, 10 Drawing Sheets

(56) References Cited

U.S. PATENT DOCUMENTS

| | | | |
|---|---|---|---|
| 9,146,907 B1* | 9/2015 | Joshi | G06K 15/1842 |
| 9,620,086 B1 | 4/2017 | Joshi et al. | |
| 2002/0033824 A1* | 3/2002 | Stamm | G06F 40/109 |
| | | | 345/471 |
| 2002/0156816 A1 | 10/2002 | Kantrowitz et al. | |
| 2003/0193994 A1* | 10/2003 | Stickler | G06F 16/40 |
| | | | 375/150 |
| 2004/0046769 A1 | 3/2004 | Arvin et al. | |
| 2006/0017733 A1 | 1/2006 | Matskewich et al. | |
| 2006/0020889 A1 | 1/2006 | Coppinger et al. | |
| 2007/0139413 A1 | 6/2007 | Stamm et al. | |
| 2008/0303825 A1 | 12/2008 | Clegg et al. | |
| 2011/0188761 A1* | 8/2011 | Boutros | H04N 1/60 |
| | | | 382/218 |
| 2014/0136966 A1 | 5/2014 | Ma et al. | |
| 2015/0348297 A1 | 12/2015 | Kaasila et al. | |
| 2017/0322913 A1* | 11/2017 | Kukreja | G06F 3/0236 |
| 2018/0247386 A1 | 8/2018 | Zheng et al. | |
| 2018/0253878 A1* | 9/2018 | Jain | G06T 11/60 |
| 2019/0392618 A1 | 12/2019 | Dhanuka et al. | |

OTHER PUBLICATIONS

"First Action Interview Office Action", U.S. Appl. No. 16/014,683, dated Sep. 10, 2019, 3 pages.

"Final Office Action", U.S. Appl. No. 16/014,683, dated Feb. 18, 2020, 37 pages.

"Non-Final Office Action", U.S. Appl. No. 16/014,683, dated Jun. 5, 2020, 38 pages.

"Notice of Allowance", U.S. Appl. No. 16/014,683, dated Nov. 5, 2020, 10 pages.

\* cited by examiner

LIVE TEXT GLYPH MODIFICATIONS

BACKGROUND

Service provider systems continue to make advances in computing technologies to enable creation of digital content. In particular, text content is often used by digital creators to supplement graphical content (e.g., vector graphics, digital photographs, and so forth) when creating digital content intended to convey information. Conventional approaches for creating digital content provide user interfaces through which client device users can interact to add, delete, and edit both graphical and text content. With respect to text content, conventional content creation systems provide text editing tools that enable addition of characters, deletion of characters, and functionality for editing characteristics of the text content, e.g., a font, font size, text spacing characteristics, paragraph characteristics, and so forth.

Conventional content creation systems, however, support only limited functionality for generating and modifying custom typography, which is a significant aspect in creating text content. Due to this limited functionality, conventional approaches for creating custom typography conventional computing devices convert text content into an outline of the text's characters, represented by glyphs, to subsequently enable adjustment of the outline's glyph geometries. Adjusting the outline's glyph geometries, however, requires client device users to provide a multitude of inputs and interact with different tools to achieve a desired appearance of custom typography. However, once converted into an outline, conventional systems strip typographic properties from modified glyphs and prohibit subsequent interaction with modified glyphs as live text. Consequently, client device users may avoid using conventionally configured systems to create digital content that includes text content with custom typography.

SUMMARY

To overcome these problems, live text glyph modification is described. A content processing system receives a selection input to select a glyph, e.g., from text content presented via a user interface of a content editing application. Examples of this selection input include hovering a focus (e.g., a cursor) of a graphics editing tool proximate the glyph or selecting a menu option for modifying a visual appearance of the glyph. Responsive to this selection, the content processing system generates and displays an outline of the glyph's geometry. The outline of the glyph's geometry is generated with embedded information describing a glyph identifier of the selected glyph, a font type of the selected glyph, and typographic properties of the selected glyph (e.g., font size, left-bearing position, right-bearing position, baseline position, and so forth). The content processing system then enables modification of the glyph's visual appearance by providing tools to define the glyph's visual appearance relative to the glyph's original left-bearing position, right-bearing position, and baseline position, or modify the glyph's geometry relative to these three positions. Once the glyph's visual appearance has been modified, the content processing system generates a modified glyph that includes embedded information describing the glyph identifier of the original glyph, the font type for the original glyph, and typographic properties of the modified glyph. The modified glyph may be stored in a global storage resource and added to a stylistic set for the font type of the original glyph, such that a custom stylistic set is created for the font type to include the modified glyph for subsequent use. This enables the content processing system to generate and store modified glyph geometries that can be readily interchanged with original glyph geometries during the creation of text content—without destroying the ability to edit the text content using conventional text editing tools.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRAWINGS

The detailed description is described with reference to the accompanying figures.

DETAILED DESCRIPTION

Overview

Figure 1:
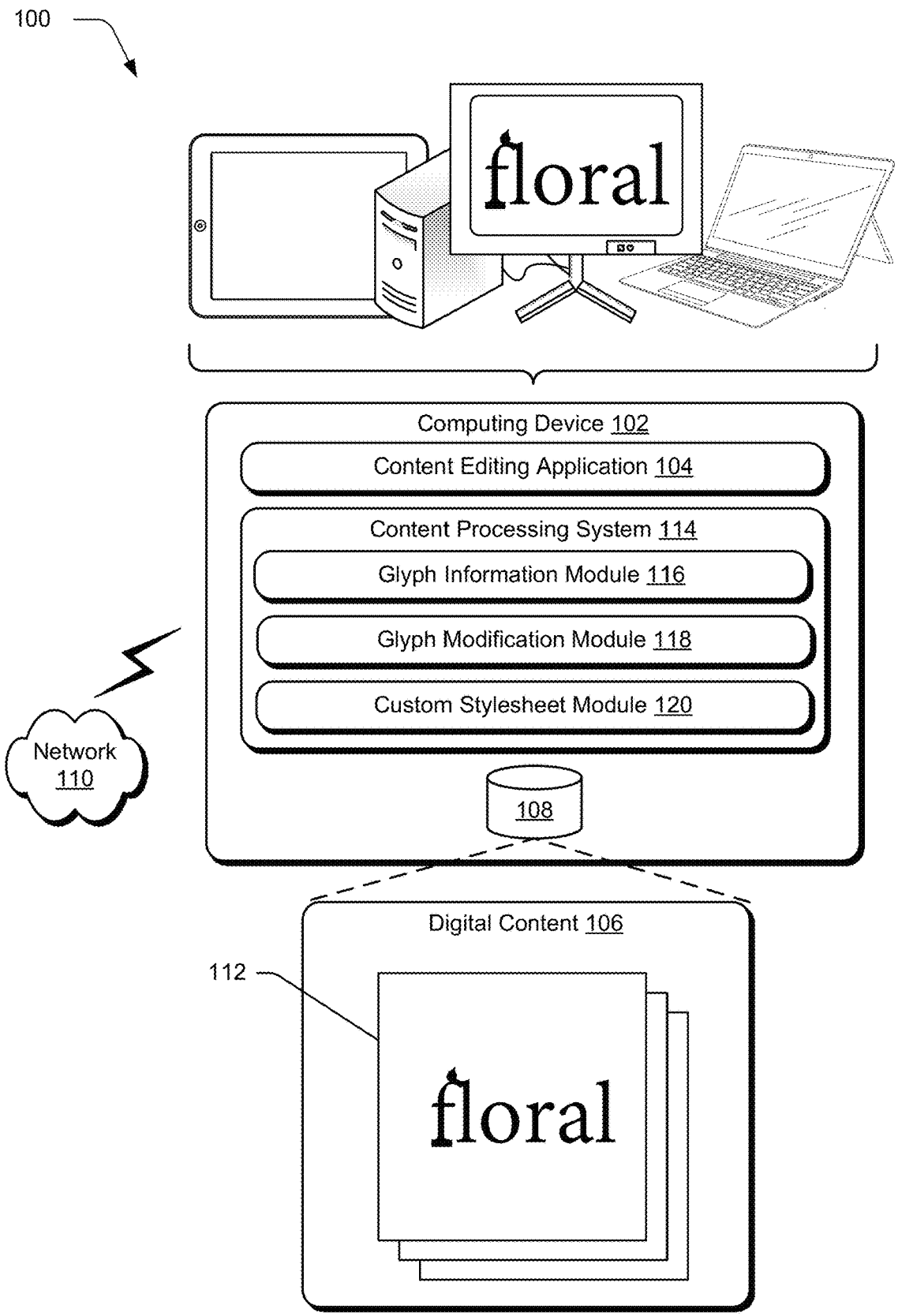
FIG. 1 is an illustration of an environment in an example implementation that is operable to employ live text glyph modification techniques described herein.

As a result of advances in digital content processing technologies, computing systems are a primary tool for content designers in creating custom typography. These computing systems enable creation of text content with unique typefaces and visual glyph appearances, which can implicitly add meaning to otherwise plain text content and make text content more aesthetically appealing. Conventional computing systems provide text editing tools that enable addition of characters, deletion of characters, and functionality for editing characteristics of the text content, e.g., a font, font size, text spacing characteristics, paragraph characteristics, and so forth. However, in enabling editing of text content, these conventional systems convert text glyphs into outline (e.g., vector graphics) and strip the original font and typography information that otherwise makes the text content editable and searchable by content processing applications.

As such, conventional systems are unable to maintain a structural similarity between unmodified and modified glyph geometries in text content, and result in digital content that includes both text and graphic elements, even in scenarios where only text is intended for display. This forces a content creator to repeatedly generate modified glyph geometries, which is an inefficient use of computational resources, and the visual similarity of different glyphs in resulting text content is dependent on the expertise and precision of the individual content creator. Thus, conventional approaches to modifying text content glyph geometry are cumbersome, tedious, and unintuitive.

To overcome these challenges, live text glyph modification is described. In accordance with the described techniques, a content processing system detects selection of a glyph in text content and generates an outline of the selected glyph. Examples of this selection input include hovering a focus (e.g., a cursor) of a graphics editing tool proximate the glyph, selecting a menu option for modifying a visual appearance of a glyph, gesture input indicating selection of the glyph, and so forth. The outline of the selected glyph is generated based on a font type of the selected glyph and a glyph identifier for the selected glyph, such that the outline provides a visual representation of the glyph as it is displayed in the text content. In some implementations, the content processing system retrieves outline information describing a shape of the glyph from font data maintained for a font type of the selected glyph. This outline information may describe the shape of the glyph in terms of Bezier curves.

The generated outline of the selected glyph may be presented in a user interface along with one or more position indicators that describe a bounding box for presentation of the glyph in textual content, relative to other glyphs of the textual content. For instance, the outline of the glyph may be presented with a baseline position indicator, which indicates an alignment position for one or more glyphs in the text content displayed on a same line as the selected glyph. Alternatively or additionally, the outline of the glyph may be presented with one or more of a left-bounding or right-bounding position indicator. The left-bounding and right-bounding position indicators are representative of a distance between adjacent glyphs of the text content displayed to the left and the right, respectively, of the selected glyph. In this manner, the content processing system displays an outline of the glyph with information that visually identifies a geometry and orientation of the glyph, relative to other glyphs of the text content.

The content processing system then receives user input modifying a visual appearance of the outline of the glyph. The outline's visual appearance may be modified in response to user input modifying a geometry of the glyph's outline, modifying a position of the glyph's outline relative to one or more position indicators, and modifying an orientation of the glyph's outline relative to the one or more position indicators. Based on the input modifying the visual appearance of the glyph's outline, the content processing system determines typographic properties for a modified glyph having a geometry defined by the modified geometry of the glyph's outline. In some implementations, the typographic properties for the modified glyph are manually defined via user input (e.g., via user input moving one or more of the position indictors relative to the glyph outline). Alternatively or additionally, the typographic properties for the modified glyph are automatically determined so that the modified glyph's geometry remains structurally and visually similar to other, un-modified glyphs of the text content including the modified glyph. In this manner, the content processing system automatically calculates various display parameters for a modified glyph, which eliminates the need for manually defining layout and display rules for individual modified glyphs.

The content processing system then generates a modified glyph having a geometry and typographic properties defined by the user input that modified the visual appearance of the outline of the selected glyph. When generating the modified glyph, the content processing system stores information with the modified glyph describing an identifier of the selected glyph from which the modified glyph was generated, a font type of the selected glyph, and the typographic properties of the modified glyph. This information may be associated with the modified glyph by embedding the information in digital content including the text content, by storing the modified glyph with the embedded information in a storage of a computing device implementing the content processing system, and so forth. In this manner, modified glyphs generated using the techniques described herein remain editable and searchable by conventional content processing applications, such as word processing applications. Thus, a visual appearance of modified glyphs can be altered in a same fashion together with unmodified glyphs of the same text content. For instance, a font size, font spacing, paragraph spacing, font characteristics (e.g., bold, italic, underline, strikethrough, etc.), kerning attributes, and so forth, of both modified and original glyphs of text content can be altered together.

Modified glyphs are then stored in a custom stylistic set associated with a font type of the selected font, such that a content editing application will recognize the modified glyphs as valid glyphs. Thus, the content processing system described herein generates modified glyphs that are recognized as valid glyphs for a given font type, without creating a new font type, modifying properties of the given font type, or generating modified glyphs in a manner that will be recognized as digital content other than text content.

Through this custom stylistic set associated with a given font type, modified glyphs can be stored and reused by the content processing system to replace different glyphs corresponding to a same base glyph identifier. For instance, in response to detecting a selection of a glyph in text content, the content processing system may identify a base glyph identifier associated with the selected glyph and further identify that one or more modified glyphs in the custom stylistic set for the given font type are also associated with the same base glyph identifier. The content processing system can then display the one or more modified glyphs as selectable options for replacing the selected glyph in the text content. In some implementations, the glyph replacement can be global for the text content, such that all instances of a glyph corresponding to the base glyph identifier are replaced with the selected modified glyph. Alternatively, individual instances of glyphs corresponding to the base glyph identifier can be replaced with different ones of the modified glyphs corresponding to the base glyph identifier, or left unmodified in the text content.

Further, in response to receiving a selection of a custom stylistic set including one or more modified glyphs for use in generating text content, the content processing system can designate the one or more modified glyphs of the custom stylistic set for use in initially outputting base glyphs in text content. For example, in response to receiving a selection of a custom stylistic set that includes a modified glyph associated with a base glyph identifier, the content processing system automatically outputs the modified glyph instead of the glyph associated with the base glyph identifier, in response to detecting input of a glyph corresponding to the base glyph identifier. This automatic initial output may be performed for any number of glyphs included in the custom stylistic set. Additionally or alternatively, a custom stylistic set may be selected for individual or global replacement of glyphs already present in text content. For instance, in a scenario where base glyph identifiers for 'a', 'b', and 'c', are each associated with a new, modified glyph in a custom stylistic set, each 'a', 'b', and 'c', glyph may be replaced with the corresponding new, modified glyph in response to receiving a selection of the custom stylistic set. In this manner, a custom stylistic set enables generating text content with modified glyphs otherwise not included in a base font type using the techniques described herein, without requiring manual replacement of individual glyphs in the text content.

Thus, by generating a modified glyph with information describing a base glyph identifier, a font type, and typographical properties for the modified glyph, the content processing system not only aids digital content creation that includes text content, but further reduces the tedious steps required by conventional systems in modifying individual glyph geometries and maintaining visual similarity with other glyphs of the text content. By associating the modified glyph with this information, the content processing system further preserves an ability of the modified glyph to function as live text content (e.g., text content that is editable with text editing tools, searchable by content editing applications, exportable to different file formats as text content, and so forth). This can lead to creation of more visually pleasing digital text content that remains searchable and editable without altering existing font type properties or requiring generation of a new font type.

Term Descriptions

As used herein, the term "glyph" refers an elemental symbol within an agreed set of symbols intended to represent a readable character for the purposes of writing. Each glyph has a shape which can be described by multiple different segments (e.g., curved and linear) that, combined, form the shape. These multiple different segments can be described, for example, using Bezier curves. Each glyph is identified within the agreed set of symbols via a glyph identifier.

As used herein, the term "font type" refers to a typeface composed of glyphs that share common design features. Each font type is associated with a specific weight, style, condensation, width, slant, italicization, ornamentation, and spacing attributes that define a visual appearance of the font type's glyphs, which are collectively referred to as the "typographic properties" for each individual glyph of the font type.

As used herein, the term "live text" refers to text content (e.g., one or more glyphs) that are editable and searchable by content processing and editing applications. Live text is contrasted with graphical objects or other digital content that represents glyphs in the form of vector objects or other outlined paths that are unable to be edited with unmodified glyphs of text content.

In the following discussion, an example environment is first described that may employ the techniques described herein. Example implementation details and procedures are then described which may be performed in the example environment as well as other environments. Consequently, performance of the example procedures is not limited to the example environment and the example environment is not limited to performance of the example procedures.

Example Environment

FIG. 1 is an illustration of a digital medium environment 100 in an example implementation that is operable to employ techniques described herein. The illustrated environment 100 includes a computing device 102, which may be configured in a variety of manners. The computing device 102, for instance, may be configured as a desktop computer, a laptop computer, a mobile device (e.g., assuming a handheld configuration such as a tablet or mobile phone), and so forth. Thus, the computing device 102 may range from full resource devices with substantial memory and processor resources (e.g., personal computers, game consoles) to a low-resource device with limited memory and/or processing resources (e.g., mobile devices). Additionally, although a single computing device 102 is shown, the computing device 102 may be representative of a plurality of different devices, such as multiple servers utilized by a business to perform operations "over the cloud" as described in FIG. 10.

The computing device 102 is illustrated as including content editing application 104. The content editing application 104 represents functionality of the computing device 102 to create and/or edit digital content. By way of example, the content editing application 104 includes functionality to edit digital content, such as text content. Further, the content editing application 104 may enable a client device user to interact with application interfaces presented via the computing device 102 to perform content editing operations, such as selecting portions of text content, adding text content to other digital content, removing text content from digital content, editing text content, editing typographic properties of the text content (e.g., size, font, font weight, kerning, paragraph style, alignment, hyphenation, and so on), and so forth. The content editing application 104 may facilitate other content editing operations without departing from the spirit or scope of the techniques described herein. The content editing application 104 may further be representative of more than one application that supports functionality to perform content editing operations without departing from the spirit or scope of the techniques described herein.

The digital content, relative to which the content editing application 104 is configured to perform operations, is represented by digital content 106, which is illustrated as maintained in storage 108 of the computing device 102. Although the digital content 106 is illustrated as being maintained in the storage 108, the digital content 106 is further representative of digital content accessible to the computing device 102 in other manners, such as digital content that is accessible to the computing device 102 from storage of another device over network 110. In such implementations, the computing device 102 may represent functionality to perform the live text glyph modification described herein for other devices, e.g., to reduce computational resources otherwise required by the other devices to perform the live text glyph modification. Thus, the computing device 102 may configured to provide live text glyph modification as a service implemented remotely from one or more client computing devices.

The digital content 106 may represent various types of digital content without departing from the spirit or scope of the techniques described herein. In the illustrated example, the digital content 106 includes modified live text 112, such as the word "floral", which includes six separate glyphs. Although the six separate glyphs of the illustrated modified live text 112 are of a same font type, the 'f' glyph is illustrated as having a visually modified geometry, with a leaf appearing to stem from the top of the glyph and a thicker base than that of an unmodified 'l' glyph of the same font type. Although illustrated as including only one modified glyph with two specific modifications, the techniques described herein may be used to generate modified glyphs having any number of geometric modifications and custom typography including multiple modified glyphs. In this manner, the modified live text 112 is representative of custom typography that may be used by a digital creator for creating stylized digital content 106 without sacrificing the ability to subsequently edit live text that includes the custom typography. As described in further detail below, by generating custom glyphs that include embedded information describing an original glyph identifier, a font type of the original glyph, and typographic properties of the modified glyph, the described techniques do not involve conversion of glyphs to outlines or shapes in such a way that the glyphs can no longer be edited as text, e.g., font changed, kerning changed, font size changed, editing which letters are included and deleted based on a location of a text cursor (e.g., a caret) and typing with keys of a keyboard, and so forth. In this context, consider content processing system 114, which is depicted having glyph information module 116, glyph modification module 118, and custom stylesheet module 120.

In the illustrated environment 100, the computing device 102 is depicted including the content processing system 114, the functionality of which may be incorporated in and/or accessible to the content editing application 104. The content processing system 114 is implemented at least partially in hardware of the computing device 102 to generate an outline of a glyph selected from text content, enable modification of the generated glyph outline, and generate a modified glyph that has a visual appearance of the modified glyph geometry while retaining the glyph identifier and font type of the original glyph, along with typographic properties of the modified glyph that enable the modified glyph to function as live text. Modified glyphs may be subsequently stored in a custom stylistic set associated with a font type of the original glyph and mapped to a glyph identifier for the original glyph, such that the modified glyph can be presented as an alternate option for displaying other glyphs having the same glyph identifier. To do so, the content processing system 114 employs the glyph information module 116, the glyph modification module 118, and the custom stylesheet module 120.

The glyph information module 116, the glyph modification module 118, and the custom stylesheet module 120 are implemented at least partially in hardware of the computing device 102 (e.g., through use of a processing system and computer-readable storage media), as described in further detail below with respect to FIG. 9. In one or more implementations, the glyph information module 116 generates an outline of a glyph selected from text content, e.g., a shape corresponding to the selected glyph.

To generate the glyph outline, the glyph information module 116 determines a glyph identifier for the selected glyph, a font type of the selected glyph, and typographic properties of the selected glyph, such as geometric characteristics of the selected glyph's strokes relative to a right-bearing position, a left-bearing position, and a baseline position for the selected glyph, as described in further detail below with respect to FIG. 3. In accordance with one or more implementations, the glyph information module 116 determines the glyph identifier, font type, and typographic properties using a font dictionary stored in the storage 108. The generated glyph outline is thus a representation of the original glyph, and may be described in terms of multiple segments using Bezier curves, scalable vector graphics (SVG), and the like.

The glyph modification module 118 presents the generated glyph outline via a user interface (e.g., of the content editing application 104) with one or more tools for modifying the geometry of the glyph outline. For instance, the glyph modification module 118 may display the glyph outline relative to a left-bearing position indicator, a right-bearing position indicator, and a baseline position indicator, which are representative of one or more display boundaries for the glyph, relative to other glyphs of the text content. Consider a serif font, such as "Times New Roman," for example. Many of the glyphs in serif fonts include strokes where the terminals (the ends of the strokes) end in a serif—a semi-structural detail or small decorative flourish. In this example, the glyph modification module 118 may generate position indicators that bound the leftmost, rightmost, and bottom flourishes of stems of a serif version of a letter. A distance between the stems and flourishes relative to the left-bearing and right-bearing position indicators may thus correspond to a relative display distance between adjacent letters of the text content.

The glyph modification module 118 enables modification of the glyph outline via user input moving one or more of the displayed position indicators. Alternatively or additionally, the glyph modification module 118 enables modification of the glyph outline via user input adding and/or removing glyph geometry relative to the displayed position indicators. In one or more implementations, the glyph modification module 118 automatically calculates a baseline position for a modified glyph geometry such that the modified glyph geometry will maintain a similar visual appearance with other glyphs of a same font type, same font size, same font attributes, and so forth. Thus, the glyph modification module 118 enables a user of the content processing system 114 to avoid manually converting text content to outlines of glyph shapes and manually providing input to designate position indicators around these outlines. The glyph modification module 118 further enables users of the content processing system 114 to adjust geometric features of a selected glyph relative to the automatically defined position indicators, such as to create glyphs for custom typography.

The custom stylesheet module 120 stores the modified glyph with information describing a glyph identifier of the original selected glyph, a font type of the original selected glyph, and typographic properties of the modified glyph in a storage object associated with the font type. In this manner, the custom stylesheet module 120 preserves glyph characteristics that enable a glyph to function as live text that remains editable and searchable. The custom stylesheet module 120 leverages the continuous nature of glyph identifiers by assigning a custom glyph identifier to the modified glyph that is incremented from a maximum glyph identifier that exists for a particular font type.

For instance, in an example scenario where a modified glyph is of a "Times New Roman" font type, a maximum glyph identifier for unmodified glyphs of the font type may be 100, and the custom stylesheet module 120 will assign a glyph identifier of 101 to a modified glyph. Continuing this example, subsequent modified glyphs created from a base Times New Roman glyph will be assigned custom glyph identifiers of 102, 103, and so forth. In this manner, the custom stylesheet module 120 preserves modified glyphs and their associated typographic properties in a storage object associated with a particular font type, such that modified glyphs are identified by the content processing system 114 as valid glyphs for the font type.

By storing the modified glyph in a storage object associated with a base glyph identifier for a given font type, the custom stylesheet module 120 enables the content processing system 114 to present a modified glyph geometry as an alternate for a base glyph when generating and/or editing live text. Thus, the custom stylesheet module 120 enables a user of the content processing system 114 to avoid manually reconstructing modified glyph geometries at each instance of using a modified glyph in custom typography. Modified glyphs can further be saved for reusability, exported for use in a different format, and so forth. Because modified glyphs are stored with associated typographic information intact, the modified glyphs can subsequently be edited using the full power of text content editing applications, such as content editing application 104. Operation of the glyph information module 116, the glyph modification module 118, and the custom stylesheet module 120 is described in further detail below.

Live Text Glyph Modification

Figure 2:
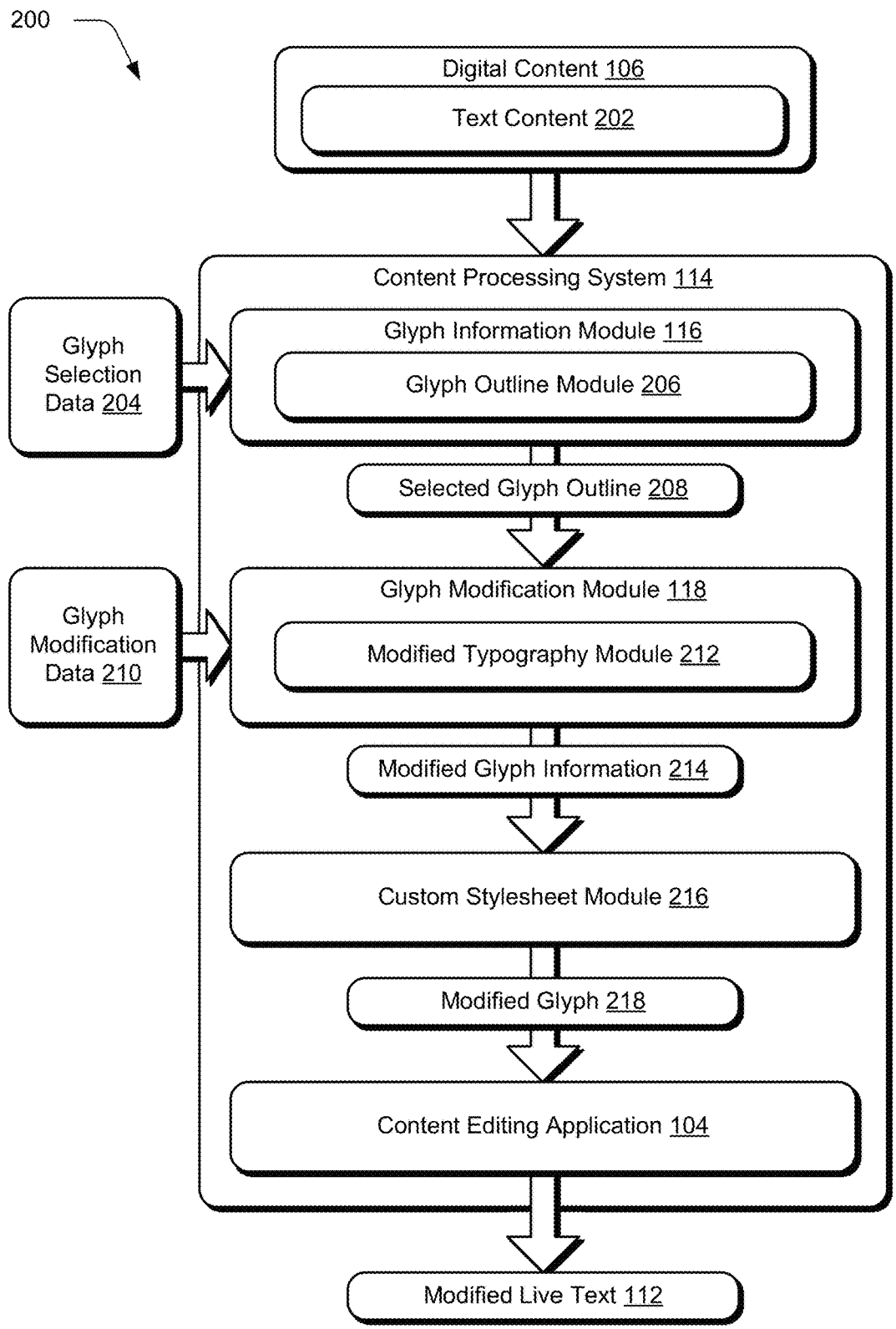
FIG. 2 depicts an example implementation in which a content processing system of FIG. 1 generates modified live text using a modified glyph.

FIG. 2 depicts a system 200 in an example implementation showing operation of the content processing system 114 and the content editing application 104 of FIG. 1 in greater detail as generating modified live text, given text content and received input modifying a visual appearance of at least one glyph of the text content. Using the techniques described herein, the modified live text is generated without removing a capability of the individual glyphs of the text content to function as editable text, independent of whether the individual glyphs have been modified.

In the illustrated example, the content processing system 114 receives digital content 106 that includes text content 202. As an example, the text content 202 may correspond to the text content (e.g., "floral") of the modified live text 112, as illustrated and described above with respect to FIG. 1. Given the text content 202, the glyph information module 116 of the content processing system 114 receives glyph selection data 204 indicating a selection of a glyph of the text content 202. Thus, the glyph selection data 204 identifies a particular glyph of the text content 202 to be used as a basis for generating a modified glyph. In accordance with one or more implementations, the glyph selection data 204 is received as part of user input at a computing device implementing the content processing system 114, such as the computing device 102 of FIG. 1. Example user inputs that are effective to select a glyph for initiation of glyph modification are described in further detail below with respect to FIG. 3.

Upon receiving the glyph selection data 204 indicating a selection of a glyph in the text content 202, the glyph information module 116 passes the glyph selection data 204 to a glyph outline module 206. The glyph outline module 206 is representative of functionality to generate a selected glyph outline 208 for the glyph selected via the glyph selection data 204. To generate the selected glyph outline 208, the glyph outline module 206 accesses a font dictionary to obtain information about the selected glyph. In accordance with one or more implementations, the font dictionary may be stored in the storage 108 of computing device 102, as illustrated in FIG. 1.

Specifically, the glyph outline module 206 determines a glyph identifier of the selected glyph, a font type of the selected glyph, and typographic properties of the glyph identifier, such as left-bearing, right-bearing, baseline position, and so forth. The glyph outline module 206 further obtains outline information from the font dictionary which describes one or more Bezier segments (e.g., cubic or quadratic)—Bezier segments can be used to represent both lines and curves—that combine to form a glyph's outline in the corresponding font. The selected glyph outline 208 is thus a vector art representation of the selected glyph form the text content 202, which is communicated to the glyph modification module 118 to enable modifying the selected glyph outline 208.

After receiving the selected glyph outline 208, and as described in further detail below with respect to FIGS. 3 and 4, the glyph modification module 118 presents the selected glyph outline 208 in a user interface that includes left-bearing, right-bearing, and baseline position indicators, which describe a display position of the selected glyph relative to adjacent glyphs of the text content 202. User input can then be received via the user interface to adjust a geometry of the selected glyph outline 208, which is communicated to the glyph modification module 118 via the glyph modification data 210. The glyph modification data 210 is representative of one or more modifications to visual glyph attributes, such as adjusting stem width, adjusting serif width, adjusting contrast, adding or removing serifs, an edit to a glyph's geometry, and so forth. Upon receiving the glyph modification data 210, the glyph modification module passes the glyph modification data 210 to the modified typography module 212.

The modified typography module 212 is representative of functionality to determine typographic properties for a modified glyph generated from the glyph modification data 210. In one or more implementations, the glyph modification data 210 describes typographic properties of the selected glyph outline 208 as manually specified by a user that generated the glyph modification data 210, described in further detail with respect to FIG. 3. Alternatively, the glyph modification data 210 may only describe changes in a geometry of the selected glyph outline 208. In this scenario, the modified typography module 212 automatically, without user intervention, determines typographic properties for the modified glyph generated from the glyph modification data 210, such that the modified glyph maintains a visual cohesion with other glyphs of the text content 202, described in further detail with respect to FIG. 4.

Modifications to one or more of the typographic properties or geometry of the selected glyph outline 208 are then communicated as modified glyph information 214 to the custom stylesheet module 216. In addition to describing modifications to typographic properties and/or geometry of the selected glyph outline 208, the modified glyph information 214 includes information describing the glyph identifier of the selected glyph and the font type of the selected glyph, which maintains a *nexus* between the original selected glyph from the text content 202 and a modified glyph 218 using the glyph modification data 210.

The custom stylesheet module 216 generates the modified glyph 218 identifier with embedded information describing the glyph identifier of the selected glyph from the text content 202, the font type of the selected glyph, and typographic properties of the modified glyph 218 that result from the glyph modification data 210 applied to the selected glyph outline 208. Additionally, the modified glyph 218 includes embedded information describing a geometric shape of the modified glyph 218, a score representing differences between the modified glyph 218 and the selected glyph from the text content 202. The modified glyph 218 is additionally assigned a custom glyph identifier. In order to generate the custom glyph identifier, the custom stylesheet module 216 determines the last sequential glyph identifier of the font type for the selected glyph of the text content 202 and increments by one.

For any further modified glyphs created from a selected glyph of the same font type, the custom stylesheet module 216 assigns a custom glyph identifier that increments by one from a last custom glyph identifier value assigned for the font type. In this manner, the customs stylesheet module 216 ensures that a custom glyph identifier remains contiguous with other glyph identifiers of a corresponding font type so that the content editing application 104 of FIG. 1 will recognize the custom glyph identifier as a valid glyph.

By creating a custom glyph identifier that is contiguous with other glyph identifiers of a given font type, the content processing system 114 generates a modified glyph 218 without modifying an existing font type of the selected glyph from the text content 202 and without creating a new font type. To ensure that the modified glyph 218 is recognized as a valid glyph, the custom stylesheet module 216 specifies a custom stylistic set for which the modified glyph 218 is to be added. In some implementations, the custom stylesheet module 216 creates the custom stylistic set for the modified glyph 218 and identifies the created custom stylistic set by a feature tag, as described in further detail below. In some implementations, the stylistic set for a given font type is determined by accessing a font dictionary stored in storage 108 of the computing device 102, as illustrated in FIG. 1. Alternatively, the stylistic set for the given font type is determined by accessing information stored remotely from the computing device 102, such as via the network 110.

The modified glyph 218 is then stored in a custom stylistic set for the given font type, which may include any number of modified glyphs 218 generated for the given font type. Each custom stylistic set is identifiable by a feature tag "cs<custom stylistic number>", such as "cs01", "cs02", and so forth. The custom stylesheet module 216 then creates an array with an index corresponding to the custom stylistic set number, and a value identifying the glyph identifier of the selected glyph from the text content 202 and the custom glyph identifier of the modified glyph 218. By identifying the custom stylistic set with the feature tag, a computing device implementing the content processing system 114 is able to process the modified glyph 218 of the custom stylistic set in a manner similar to processing other font features, such as font features included in the OpenType specification. In one or more implementations, the content processing system 114 enables a user to specify via user input which custom stylistic set the modified glyph 218 is to be applied. Alternatively, the content processing system 114 may automatically assign the modified glyph 218 to a particular custom stylistic set.

The custom stylistic set including the modified glyph 218 may then be stored for subsequent retrieval, such as in the computing device 102's storage 108, illustrated in FIG. 1. In one or more implementations, the modified glyph 218 is communicated to the content editing application 104 in order to generate modified live text 112. Because the modified glyph 218 is indelibly linked to the original glyph selected from the text content 202, the modified glyph 218 can be used by the content editing application as the initial output for any subsequent input corresponding to the base glyph identifier of the modified glyph. For instance, considering the modified 'f' glyph of the modified live text 112 of FIG. 1, a subsequent 'f' keystroke at a keyboard connected to the computing device 102 implementing the content editing application 104 may output the modified 'f' glyph instead of the base 'f' glyph for the font type. Alternatively, a subsequent 'f' keystroke, or any other suitable type of input, may cause output of the base 'f' glyph for a current font type, and the modified 'f' glyph as illustrated in the modified live text 112 may be presented as an alternate option for the base glyph, as described in further detail below with respect to FIG. 7.

Because the content processing system 114 generates a modified glyph 218 with retained typographic properties, base glyph identifier, and font type information, each glyph of the modified live text 112 remains editable and searchable, regardless of whether individual glyphs of the modified live text 112 have themselves been modified via the content processing system 114.

Figure 3:
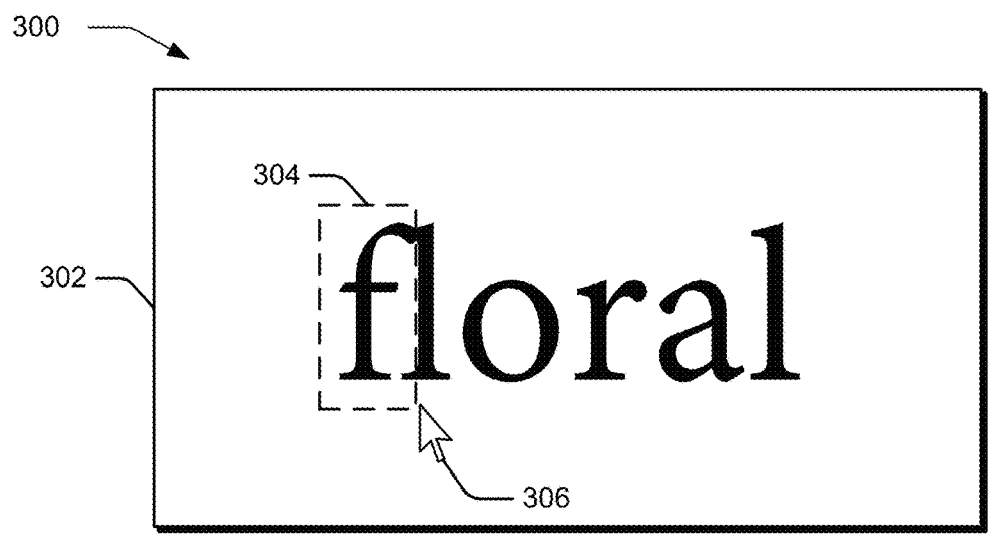
FIG. 3 depicts an example selection and modification of a glyph.
Figure 3:
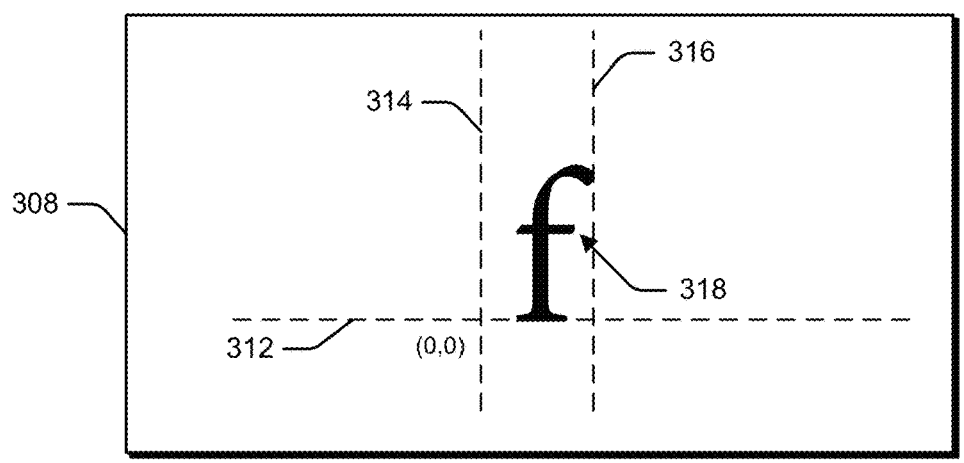
Figure 3:
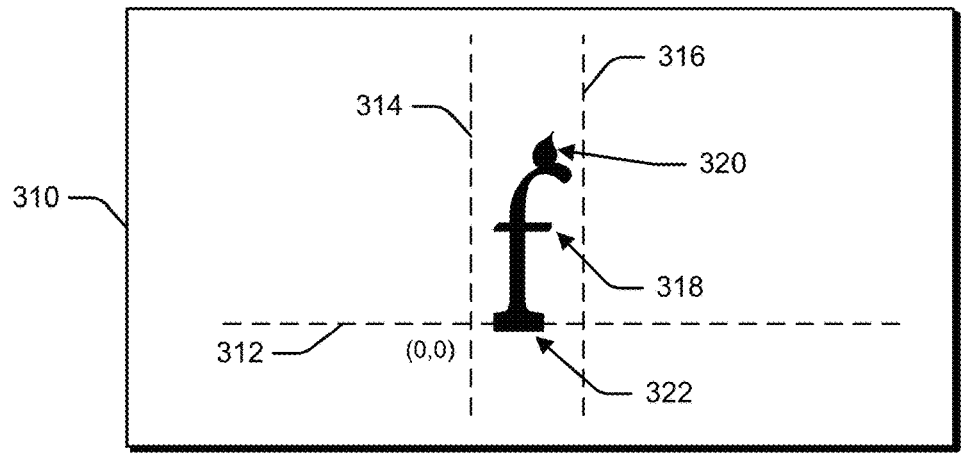

FIG. 3 depicts an example implementation 300 of receiving the glyph selection data 204 to select a glyph from the text content 202 and generate a modified glyph 218 using the techniques described herein. In the illustrated example, a first user interface configuration 302 includes a display of text content, such as the text content 202 as illustrated in FIG. 2. The first user interface configuration 302 further illustrates an example scenario of selecting a glyph 304 (e.g., "f") of the text content, via a cursor 306. In one or more implementations, a position of the cursor 306 proximate to the glyph 304 (e.g., within a threshold distance or bounding box of the glyph 304) is effective to select the glyph 304 for modification. Alternatively or additionally, the glyph 304 may be selected for modification by hovering the cursor 306 proximate to the glyph 304 for an amount of time that satisfies a threshold amount of time.

In some implementations, the cursor 306 may not be presented in the first user interface configuration 302. Instead, user input to select a glyph may be received via touch and/or stylus input, such that a finger or stylus hovers proximate a glyph for the selected amount of time. In any case, such input received in relation to the glyph 304 is recognizable by the glyph information module 116 as glyph selection data 204 and causes the glyph outline module 206 to generate a selected glyph outline 208 for the glyph 304, as illustrated in FIG. 2.

FIG. 3 depicts an example implementation 300 of receiving the glyph selection data 204 to select a glyph from the text content 202 and generate a modified glyph 218 using the techniques described herein. To do so, the glyph modification module 118 of the content processing system 114 presents a user interface of a selected glyph along with one or more tools for modifying a visual appearance of the selected glyph. In the illustrated example, a first user interface configuration 302 includes a display of text content, such as the text content 202 as illustrated in FIG. 2. The first user interface configuration 302 further illustrates an example scenario of selecting a glyph 304 (e.g., "f") of the text content, via a cursor 306. In one or more implementations, a position of the cursor 306 proximate to the glyph 304 (e.g., within a threshold distance or bounding box of the glyph 304) is effective to select the glyph 304 for modification. Alternatively or additionally, the glyph 304 may be selected for modification by hovering the cursor 306 proximate to the glyph 304 for an amount of time that satisfies a threshold amount of time.

In some implementations, the cursor 306 may not be presented in the first user interface configuration 302. Instead, user input to select a glyph may be received via touch and/or stylus input, such that a finger or stylus hovers proximate a glyph for the selected amount of time. In any case, such input received in relation to the glyph 304 is recognizable by the glyph information module 116 as glyph selection data 204 and causes the glyph outline module 206 to generate a selected glyph outline 208 for the glyph 304, as illustrated in FIG. 2.

Examples of the selected glyph outline 208 and modified glyph 218 are represented at second and third user interface configurations 308 and 310, respectively. In the illustrated examples, the second user interface configuration 308 includes a baseline position indicator 312, a left-bearing position indicator 314, and a right-bearing position indicator 316 for a selected glyph outline 318. The position indicators 312, 314, and 316 together define a bounding box for the selected glyph outline 318, where the bounding box illustrates a display position of the selected glyph outline 318 relative to neighboring glyphs of the text content 202. The selected glyph outline 318 is representative of a glyph selected from the text content 202 via the glyph selection data 204, as illustrated in FIG. 2. Although three position indicators 312, 314, and 316 are displayed in the second user interface configuration 308, any number of position indicators may be displayed for a selected glyph, and one or more position indicators may be aligned in any orientation relative to the selected glyph outline 318 without departing from the scope of the techniques described herein.

The second user interface configuration 308 enables a user of a computing device implementing the content processing system 114 to manually adjust one or more typographic properties of the selected glyph outline 318 by moving one or more of the position indicators relative to the selected glyph outline 318. For instance, the left-bearing position indicator 314 may be moved further to the left relative to the selected glyph outline 318, such that the left-bearing position indicator 314 is associated with a negative x-axis value in a Cartesian coordinate system. Moving the left-bearing position indicator 314 further away from the selected glyph outline 318 effectively increases an amount of space between a modified glyph generated from the selected glyph outline 318 and another glyph that directly precedes the selected glyph outline 318 in the text content 202. Conversely, moving the left-bearing position indicator 314 closer to the selected glyph outline 318 along the x-axis effectively decreases the amount of space between the modified glyph generated from the selected glyph outline 318 and another glyph that directly precedes the selected glyph outline 318 in the text content 202.

Alternatively or additionally, the various position indicators 312, 314, and 316 can be rotated to modify an orientation of the selected glyph outline 318 relative to adjacent glyphs of the text content 202. For example, the position indicators 312, 314, and 316 can be rotated about the point indicated at (0,0) by any magnitude to generate a modified glyph that is displayed as visually skewed relative to the other glyphs of the text content illustrated in the first user interface configuration 302. The right-bearing and baseline position indicators 312 and 316 may be manually adjusted via user input in a similar manner. Alternatively or additionally, the selected glyph outline 318 itself can be moved relative to the various position indicators 312, 314, and 316 to adjust a display position and/or orientation of a modified glyph relative to surrounding glyphs of text content, such as a position and orientation of the modified glyph 218 relative to the text content 202, as illustrated in FIG. 2. Input manipulating a position or orientation of the selected glyph outline 318 relative to the position indicators 312, 314, and 316, or vice versa, may be received as part of the glyph modification data 210, as illustrated in FIG. 2.

In addition to manually adjusting the typographic properties of the selected glyph outline 318 by adjusting one or more of a position or orientation of the selected glyph outline 318 relative to the position indicators 312, 314, and 316, the content processing system 114 enables a user to modify the geometry of the selected glyph outline 318. In the third user interface configuration 310, the selected glyph outline 318 includes geometric modifications 320 and 322. The geometric modifications 320 and 322 may be received as part of the glyph modification data 210, as illustrated in FIG. 2. After modification(s) to the selected glyph outline 318 are complete, the glyph modification module 118 generates modified glyph information 214 describing the modification(s).

In some implementations, the modified glyph information 214 may include geometric modifications to the selected glyph outline 208 without including manually specified typography properties (e.g., manually defined baseline, left-bearing, and/or right-bearing position indicators). In these implementations, the content processing system 114 automatically determines typography properties to be included in the modified glyph information 214 so that a resulting modified glyph 218 maintains a visual cohesion with other glyphs of the text content 202.

Figure 4:
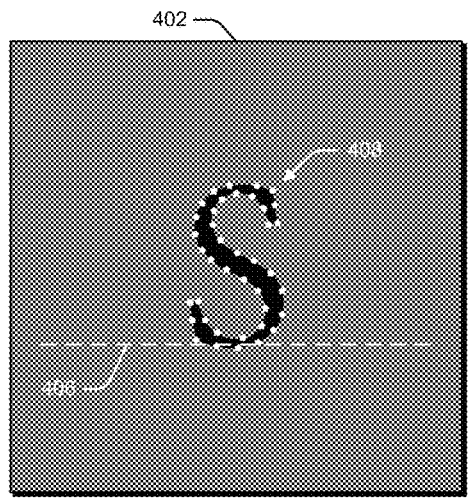
FIG. 4 depicts an example modification of a glyph and automatic determination of typographic properties for the modified glyph.
Figure 4:
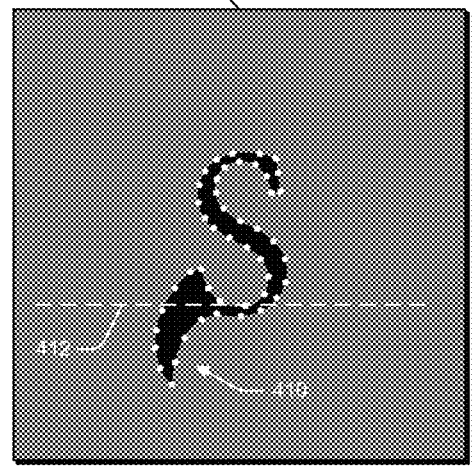

FIG. 4 depicts an example implementation 400 of automatically determining typography properties for a modified glyph such that the modified glyph maintains a visual similarity relative to other glyphs of text content including the modified glyph. The illustrated example depicts an original glyph 402 and a modified glyph 404. The original glyph 402 is illustrated as being bounded by a baseline position indicator 406 and having a geometry 408. In implementations, the original glyph 402 may be representative of a selected glyph outline 208 generated by the glyph outline module 116, where the baseline position indicator 406 and the glyph geometry 408 are identified by the glyph information module 116 based on a glyph identifier and font type of the original glyph 402.

The modified glyph 404 is illustrated as having a modified geometry 410. The modified geometry 410 may, for example, be received at the glyph modification module 118 via glyph modification data 210, as illustrated in FIG. 2. In the illustrated example, only modifications to the original glyph's geometry 408 are received via glyph modification data 210. Thus, in order for the modified glyph 404 to maintain visual similarity with other glyphs of text content including the modified glyph 404, the modified typography module 212 is configured to automatically determine typography properties for the modified glyph 404. In the illustrated example, the automatically determined typography properties for the modified glyph 404 are represented by the modified baseline position indicator 412.

Because the baseline position indicator 406 for the original glyph 402 generally correlates to a bottom of the original glyph geometry 408, simply assigning the modified baseline position indicator 412 to a bottom of the modified glyph geometry 410 fails to account for a magnitude of modifications to the original glyph's geometry 408. As a result, substantial modifications to the original glyph's geometry, as represented by the modified geometry 410, would prohibit the modified glyph 404 from aligning with other glyphs of text content that includes the modified glyph 404.

To ensure that a modified glyph geometry 410 maintains alignment with other glyphs of text content including the modified glyph 404, the modified typography module 212 of FIG. 2 determines how much of a modification is being made in the geometry of the modified glyph 404 relative to the original glyph 402 using one or more of Iterative Closest Point (ICP) or Closest Point Drift (CPD) computational approaches. Specifically, the modified typography module 212 performs uniform sampling of the different cubic Beziers in the glyph geometry of both the original glyph 402 and the modified glyph 404, illustrated by the white dots outlining the respective geometry 408 and modified geometry 410. The modified typography module 212 defines a first set of samples ("Samples1") using the original glyph geometry 408 and a second set of samples ("Samples2") using the modified glyph geometry 410. Applying CPD to (Samples 1, Samples2), the modified typography module 212 computes both a registration values and a score value using the original glyph geometry 408 and the modified glyph geometry 410. The registration values describes, for each sampling point, a correlation between the sampling point of the original and modified geometries 408 and 410. The score value describes overall how close Samples1 matches Samples2.

The modified typography module 212 then determines a set of sample points which lie near the baseline position indicator 406 of the original glyph 402. Using the determined registration values, the modified typography module 212 identifies sample points of the modified glyph 404 that correspond to the determined set of sample points that lie near the modified position indicator 406. Given this information, the modified typography module 212 averages the sample points of the modified glyph 404 and uses this value to designate a position for the modified baseline position indicator 412. For instance, in the context of determining a baseline position indicator, the y-axis values of each sample point of the modified glyph 404 identified as corresponding to the set of sample points near the baseline position indicator 406 are averaged to determine a position of the modified baseline position indicator 412 relative to the y-axis. Although described with respect to a baseline position indicator for the modified glyph geometry 410, the modified typography module 212 is configured to automatically determine any suitable modified typography property in a similar manner, such as a left-bearing position indicator, a right-bearing position indicator, and so forth. Thus, the content processing system 114 is configured to automatically determine typography properties for a modified glyph 218 without user input, so that the modified glyph 218 maintains a visual cohesion with unmodified glyphs of a same font type. The automatically determined typography properties can then be communicated as modified glyph information 214 to the custom stylesheet module 216 for use in generating a modified glyph 218, as illustrated in FIG. 2.

Figure 5:
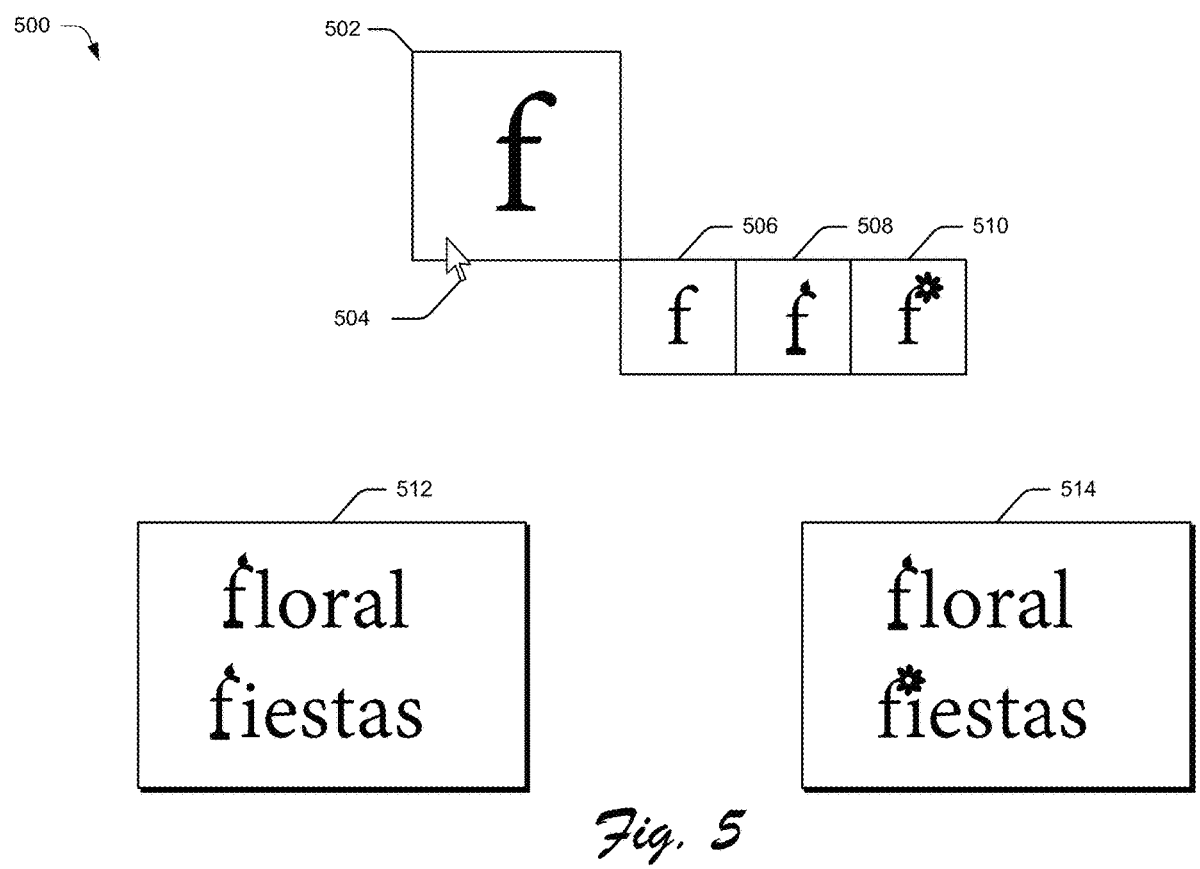
FIG. 5 depicts an example implementation of modifying live text with a modified glyph.

FIG. 5 depicts an example implementation 500 of generating modified live text using a modified glyph. In the illustrated example, a selection of the 'f' glyph 502 is received via input from the cursor 504. For example, the glyph 502 may be displayed by the computing device 102 illustrated in FIG. 1, as part of text content 202 as illustrated in FIG. 2, in the first user interface configuration 302 of FIG. 3. The selection of the glyph 502 may be received by the glyph information module 116 of the content processing system 114 as part of the glyph selection data 204, as illustrated in FIG. 2.

In the illustrated example of FIG. 5, three alternate glyphs 506, 508, and 510 are displayed as selectable options for replacing the glyph 502 with a modified glyph. In one or more implementations, the alternate glyphs 506, 508, and 510 may be displayed in response to receiving the selection of the glyph 502. The alternate glyph 506 represents an original, unmodified version of the glyph 502, while alternate glyphs 508 and 510 represent modified glyphs having different geometries and/or different typographic properties than the glyph 502. For instance, alternate glyphs 508 and 510 each include geometric regions of dissimilarity relative to the glyph 502. In implementations, these geometric regions of dissimilarity may be generated via geometric modifications received by the glyph modification module 118 of the content processing system 114 via glyph modification data 210, illustrated in FIG. 2. Upon detecting selection of the glyph 502, the glyph information module 116 determines a glyph identifier and a font type of the glyph 502 and determines whether any modified glyphs exist with embedded information corresponding to the glyph identifier and font type of the glyph 502. In the illustrated example of FIG. 5, alternate glyphs 508 and 510 are identified as two instances of modified glyphs with a same base glyph identifier and font type as the glyph 502.

Although only two modified glyphs are displayed as alternate glyphs in the illustrated example, any number of modified glyphs may be displayed as alternate glyphs in response to receiving selection of the glyph 502. In a similar manner, the alternate glyphs 506, 508, and 510 may be displayed in a scenario where the glyph 502 is a modified glyph rather than the illustrated base glyph, thereby enabling a user of the content processing system 114 to replace both base glyphs with modified glyphs, and vice versa. In some implementations, the display of alternate glyphs for the illustrated glyph 502 may exclude display of the alternate glyph 506, due to the nature of alternate glyph 506 being the same as the glyph 502. Further, although displayed as a row of alternate glyphs, the alternate glyphs 506, 508, and 510 may be displayed in any manner of visual configurations. For instance, the alternate glyph 506, representative of the base glyph corresponding to the selected glyph 502, may be displayed in a first row, with the alternate glyphs 508 and 510 displayed in a second row to further clarify differences between the various alternate glyph options.

In response to receiving a selection of one of alternate glyphs 506, 508, or 510, modified live text is generated using the selected alternate glyph. The content editing application 104 of FIG. 2, for instance, receives the selected alternate glyph as the modified glyph 218 and uses the selected alternate glyph to generate the modified live text 112. Example instances of modified live text 112 are illustrated in FIG. 5 at 512 and 514.

The modified live text 512, for example, may be generated in response to receiving selection of an "f" glyph in either "floral" or "fiesta" of the illustrated text content of modified live text 512, and subsequent selection of the alternate glyph 508. In one implementation, in response to receiving a selection of the alternate glyph 508, only the selected glyph 502 is replaced with the alternate glyph 508 to generate the modified live text 512. Thus, in order to generate the modified live text 512, a user would have to separately select the other instance of the "f" glyph and replace the other instance of the "f" glyph with a modified glyph by subsequently selecting the alternate glyph 508. In a similar manner, the modified live text 514 may be generated by selecting the alternate glyph 508 to replace the first instance of an "f" glyph in the "floral fiestas" text content and selecting the alternate glyph 510 to replace the second instance of the "f" glyph in the text content.

In an alternative implementation, multiple instances of glyphs having a common base glyph identifier are replaced with a modified glyph in response to receiving a selection of one of the alternate glyphs 506, 508, and 510. Thus, in this alternate implementation, the modified live text 512 may be generated by selecting one instance of an "f" glyph and subsequently selecting the alternate glyph 508.

In another alternative implementation, after an alternate glyph has been selected to replace a glyph in text content, subsequently inputted glyphs having a same base glyph identifier as the alternate glyph 508 are automatically displayed as modified glyphs corresponding to the selected alternate glyph. For example, consider a scenario where the modified live text 512 includes only "floral" text content. In response to receiving a selection of the alternate glyph 508 to replace the "f" glyph in "floral", any subsequently input "f" glyphs are displayed using the modified glyph of the alternate glyph 508 instead of the base glyph corresponding to the base glyph identifier.

Figure 6:
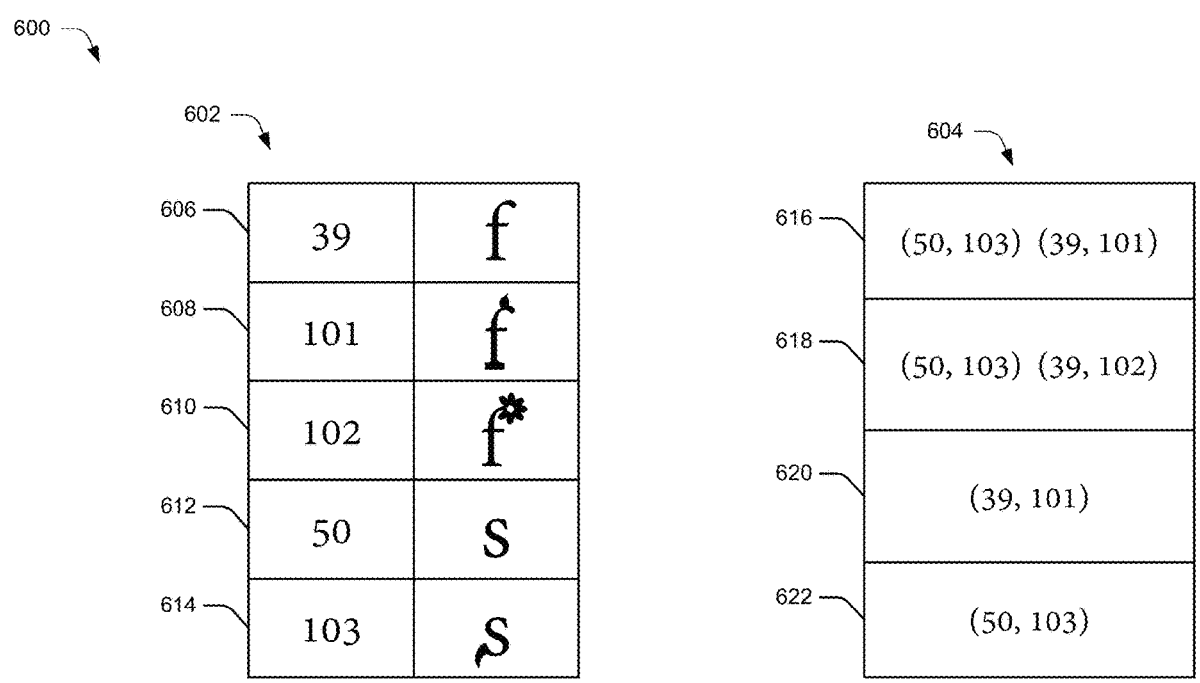
FIG. 6 depicts an example implementation of a glyph identifier map and a custom stylistic set including at least one modified glyph.

FIG. 6 depicts an example implementation 600 of a glyph identifier map 602 and a custom stylistic set table 604 including at least one modified glyph. In accordance with one or more implementations, the glyph identifier map 602 and the custom stylistic set table 604 are representative of data structures that are maintained by a computing device implementing the content processing system 114, such as in storage 108 of computing device 102, as illustrated in FIG. 1. In the illustrated example, the glyph identifier map 602 includes rows 606, 608, 610, 612, and 614, and each row is associated with a glyph identifier and a visual appearance of a glyph corresponding to the glyph identifier.

Row 606 is associated with a base glyph 'f' which, in the illustrated example, corresponds to the base glyph identifier 39. In one or more implementations, the glyph identifier for the base glyph of row 606 corresponds to the Unicode value for that particular glyph, and is indelibly linked to glyph identifiers of any modified glyphs generated from the base glyph. Rows 608 and 610 are each associated with a modified glyph generated from the base glyph of row 606, such as a modified glyph generated by the glyph modification module 118 of FIG. 1. In the illustrated example, the modified glyph of row 608 is assigned a glyph identifier of 101, and the modified glyph of row 610 is assigned a glyph identifier of 102. Row 612 is associated with a base glyph 's', which, in the illustrated example, corresponds to the base glyph identifier 50. Row 614 is associated with a modified glyph generated from the base glyph of row 612, such as a modified glyph generated by the glyph modification module 118 of FIG. 1.

Although the illustrated example depicts the glyph identifier map 602 as including only five different glyphs, the glyph identifier map 602 may include any number of base glyphs and/or modified glyphs for a given font type. The visual appearance of each base glyph and modified glyph represented by rows 606, 608, 610, 612, and 614 is representative of information describing the respective glyph geometry, and may be stored by a computing device implementing the content processing system 114 as Bezier outline information, SVG information, and so forth. In this manner, the data stored in the glyph identifier map 602 includes information that associates a glyph identifier with information describing a visual appearance of the glyph.

Given the information included in the glyph identifier map 602, the custom stylistic set table 604 can be generated for a given font type. In the illustrated example, the custom stylistic set table 604 includes rows 616, 618, 620, and 622, where each row is representative of a custom stylistic set that is identifiable by a feature tag, such as "cs01", "cs02", and so forth. In the illustrated example, each row of the custom stylistic set includes a mapping of a base glyph identifier to a glyph identifier of a modified glyph included in the custom stylistic set. For instance, row 616 includes mappings indicating that the modified glyph corresponding to glyph identifier 103 and the modified glyph corresponding to glyph identifier 101, illustrated in rows 614 and 608, respectively, of the glyph identifier map 602 are to be used in place of base glyphs corresponding to the base glyph identifiers 50 and 39, respectively, as indicated in rows 612 and 606 of the glyph identifier map 602. By contrast, row 618 of indicates that a modified glyph corresponding to the glyph identifier 103 may be used in place of a base glyph corresponding to the base glyph identifier 50.

Although the custom stylistic sets of rows 616 and 618 are each illustrated as including only two mappings for modified glyphs to respective base glyphs, any number of glyph mappings may be included in a custom stylistic set, and multiple modified glyphs may be mapped for a base glyph in accordance with one or more implementations. For example, in the illustrated example of FIG. 5, a custom stylistic set would include mappings of both alternate glyphs 508 and 510 to the base glyph 506, and optionally additional mappings of one or more modified glyphs to a base glyph.

Returning to FIG. 6, a custom stylistic set may alternatively include only a single mapping of a modified glyph to a base glyph, as indicated by the custom stylistic sets of rows 620 and 622 of the custom stylistic set table 604. For instance, row 620 indicates that a modified glyph corresponding to the glyph identifier 101 may be used in place of a base glyph having a base glyph identifier of 39. Similarly, row 622 indicates that a modified glyph having a glyph identifier of 103 may be used in place of a base glyph having a base glyph identifier of 50. Thus, the information included in the glyph identifier map 602 and the custom stylistic set table 604 is useable by a computing device implementing the content editing application 104 or the content processing system 114 of FIG. 1 to perform the live text glyph modifications described herein.

Having discussed example details of the techniques for live text glyph modifications, consider now some example procedures to illustrate additional aspects of the techniques.

Example Procedures

The following discussion describes techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to FIGS. 1-6.

Figure 7:
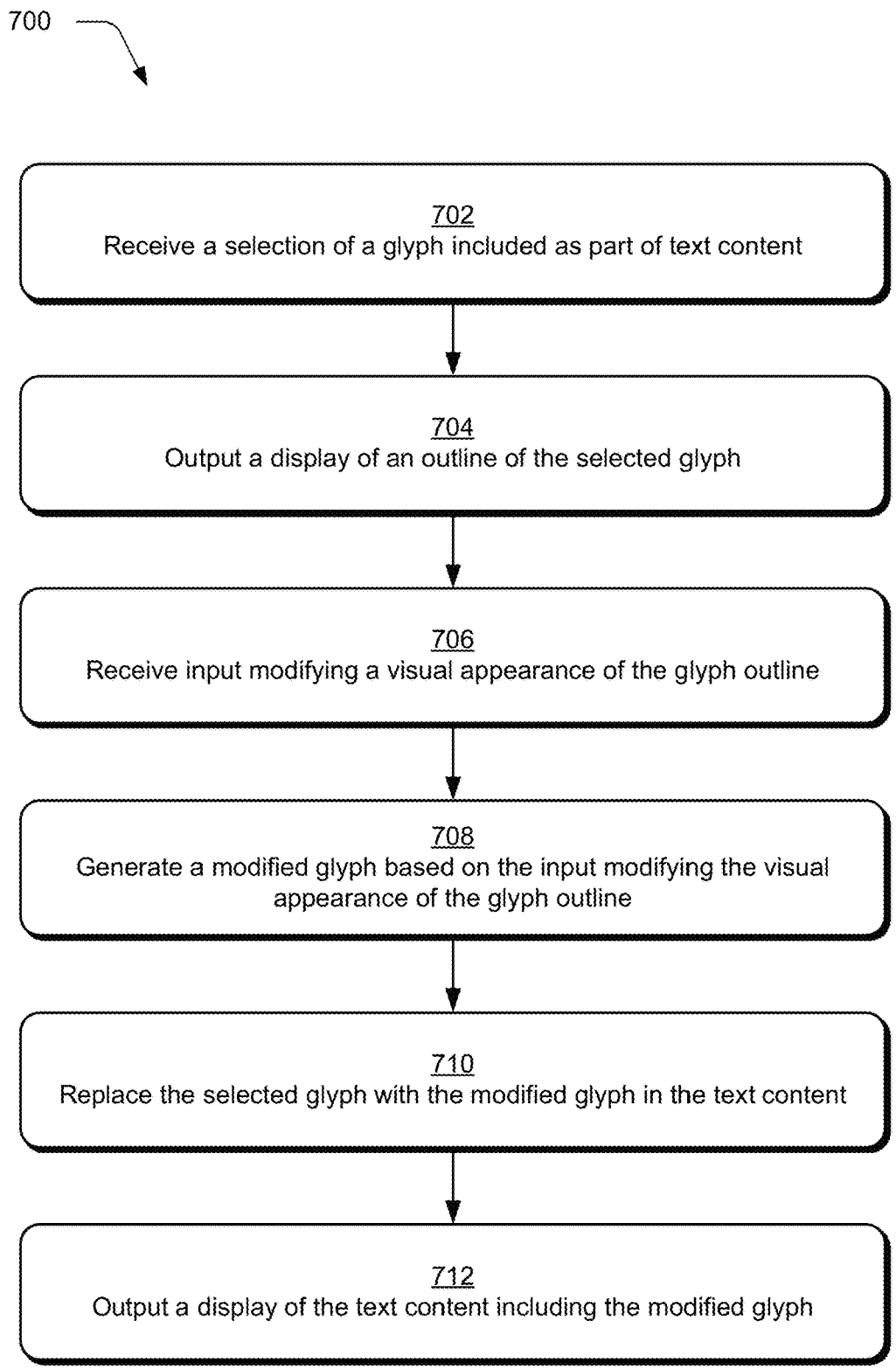
FIG. 7 is a flow diagram depicting a procedure in an example implementation for outputting a display of text content including modified glyphs.

FIG. 7 depicts a procedure 700 in an example implementation of live text glyph modifications. A selection of a glyph included as part of text content is received (block 702). The computing device implementing the content processing system 114, for instance, receives glyph selection data 204 selecting a glyph included as part of text content 202.

In response to receiving the selection of the glyph, an outline of the selected glyph is output for display (block 704). The glyph outline module 206, for instance, accesses a data resource in storage 108 of computing device 102 to retrieve an outline of the selected glyph and displays the selected glyph outline 208 in a user interface. In some implementations, the glyph outline is displayed along with one or more position indicators that are useable to represent typographic properties of the selected glyph outline, as indicated in the user interfaces of FIG. 3.

Input modifying a visual appearance of the glyph outline is then received (block 706). The glyph modification module 118, for instance, receives input as part of the glyph modification data 210 modifying one or more aspects of the glyph outline. For example, the glyph modification data 210 may modify one or more geometric aspects of the glyph outline, may alter a position of a position indicator relative to the glyph outline, may alter an orientation of a position indicator relative to the glyph outline, and so forth.

A modified glyph is then generated based on the input modifying the visual appearance of the glyph outline (block 708). For instance, the custom stylesheet module 216 receives the input modifying the visual appearance of the glyph outline as the modified glyph information 214. The custom stylesheet module 216 then embeds information describing the a base glyph identifier and a font type of the selected glyph in the digital content 106 including the text content 202, along with the modified glyph information 214 to generate the modified glyph 218.

The selected glyph is replaced with the modified glyph in the text content (block 710). The content editing application 104, for instance, replaces a glyph of the text content 202 selected via the glyph selection data 204 with the modified glyph 218. Because the glyph identifier, font type, and typographical properties of the modified glyph 218 are retained using the techniques described herein, the modified live text 112 and all its associated glyphs remain searchable and editable, e.g., by the content editing application 104. A display of the text content including the modified glyph is then output (block 712). The content editing application 104, for instance, outputs the modified live text content 512 and/or 514 for display via a user interface at a display device of the computing device 102.

Figure 8:
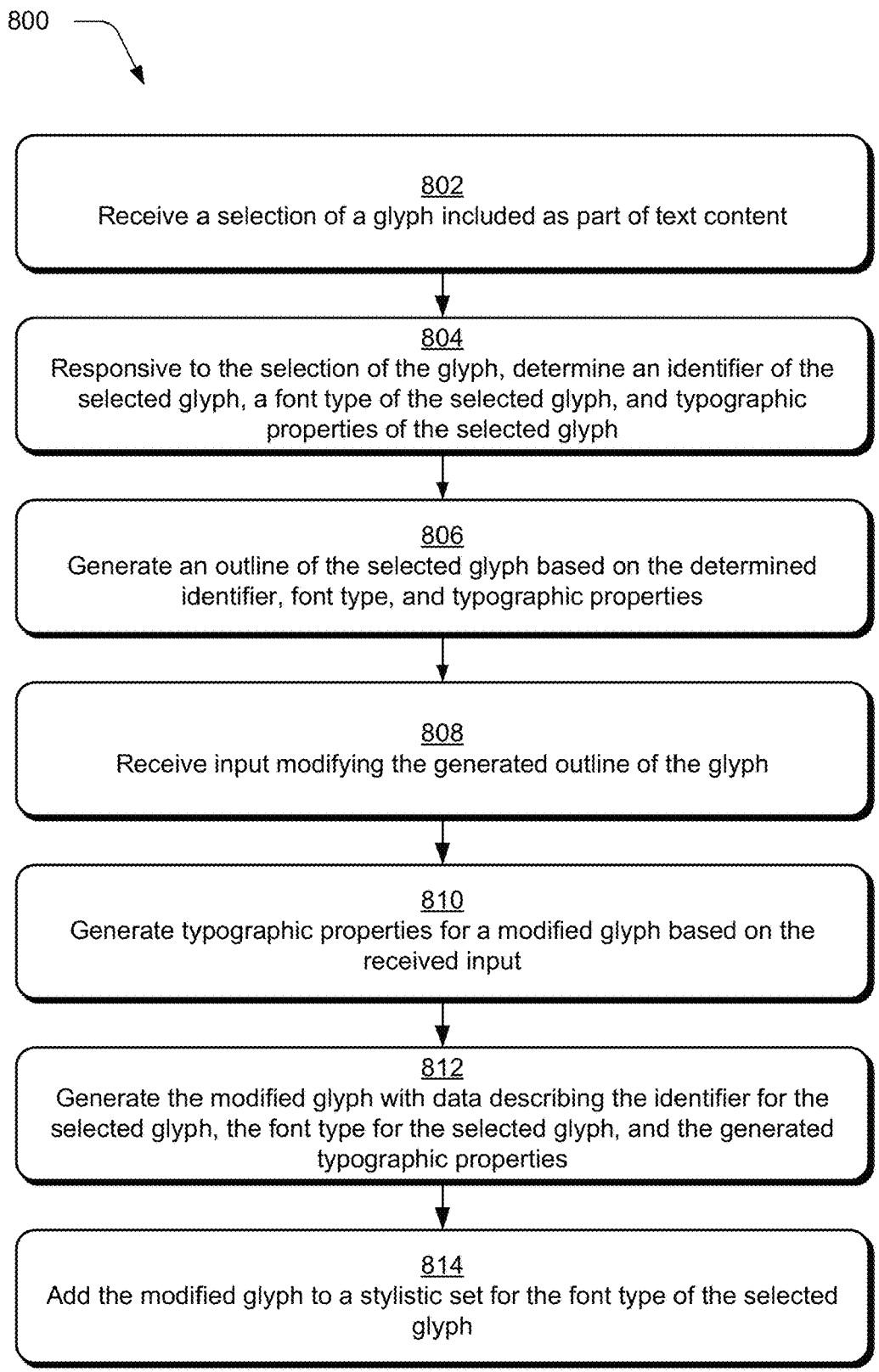
FIG. 8 is a flow diagram depicting a procedure in an example implementation for generating a modified glyph.

FIG. 8 depicts a procedure 800 in an example implementation of adding a modified glyph to a stylistic set for generating modified live text. A selection of a glyph included as part of text content is received (block 802). The computing device implementing the content processing system 114, for instance, receives glyph selection data 204 selecting a glyph included as part of text content 202.

In response to receiving the selection of the glyph, an identifier of the selected glyph, a font type of the selected glyph, and typographic properties of the selected glyph are determined (block 804). The glyph information module 116, for instance, accesses a data resource in storage 108 of the computing device 102 to retrieve information describing the identifier of the selected glyph, which may be represented in Unicode in some implementations. The glyph information module 116 additionally retrieves information describing a font type of the selected glyph, and typographic properties of the selected glyph, such as a left-bearing position indicator, a right-bearing position indicator, a baseline position indicator, and other information that is useable to describe a visual appearance of the selected glyph relative to other glyphs of the text content 202.

An outline of the selected glyph is then generated based on the determined glyph identifier, determined font type, and determined typographic properties of the selected glyph (block 806). The glyph outline module 206, for instance, accesses a data resource in storage 108 of computing device 102 to retrieve an outline of the selected glyph and displays the selected glyph outline 208 in a user interface. In some implementations, the glyph outline is displayed along with one or more position indicators that are useable to represent typographic properties of the selected glyph outline, as indicated in the user interfaces of FIG. 3.

Input modifying the generated outline of the selected glyph is then received (block 808). The glyph modification module 118, for instance, receives input as part of the glyph modification data 210 modifying one or more aspects of the glyph outline. For example, the glyph modification data 210 may modify one or more geometric aspects of the glyph outline, may alter a position of a position indicator relative to the glyph outline, may alter an orientation of a position indicator relative to the glyph outline, and so forth.

Typographic properties for a modified glyph are then generated based on the received input modifying the generated outline of the selected glyph (block 810). The modified typography module 212, for instance, determines whether a position indicator (e.g., baseline, right-bearing, left-bearing, etc.) was manually adjusted via the glyph modification data 210. In response to determining that the glyph modification data 210 indicates a manual adjustment of one or more position indicators relative to the glyph outline, the modified typography module 212 generates the modified glyph information 214 to include the typographic properties of the modified glyph outline as specified by the manual adjustment(s).

Alternatively or additionally, the modified typography module 212 automatically determines one or more typographic properties for the modified glyph by sampling the generated outline and a modified outline resulting from the received input to identify corresponding points in the respective outlines and defining certain typographic properties based correspondence between sampled points using iterative closest point or closest point drift computational techniques.

A modified glyph is then generated with data describing the identifier for the selected glyph, the font type for the selected glyph, and the generated typographic properties (block 812). For instance, the custom stylesheet module 216 receives the input modifying the visual appearance of the glyph outline as the modified glyph information 214. The custom stylesheet module 216 then embeds information describing the a base glyph identifier and a font type of the selected glyph in the digital content 106 including the text content 202, along with the modified glyph information 214 to generate the modified glyph 218.

The modified glyph is then added to a stylistic set for the font type of the selected glyph (block 814). To do so, the custom stylesheet module 216, for instance, determines the last sequential glyph identifier of the font type for the selected glyph of the text content 202 and increments by one to generate a custom glyph identifier. This custom glyph identifier is correlated with the base glyph identifier of the selected glyph, font type of the selected glyph, and typographic properties of the modified glyph in a data storage resource, such as in storage 108 of computing device 102. In this manner, the content processing system 114 generates a modified glyph 218 that is recognizable by a content editing application 104 as a valid glyph that can be exported to various destinations and reused by the content editing application 104 without destroying the ability to search for and otherwise edit the modified glyph.

Figure 9:
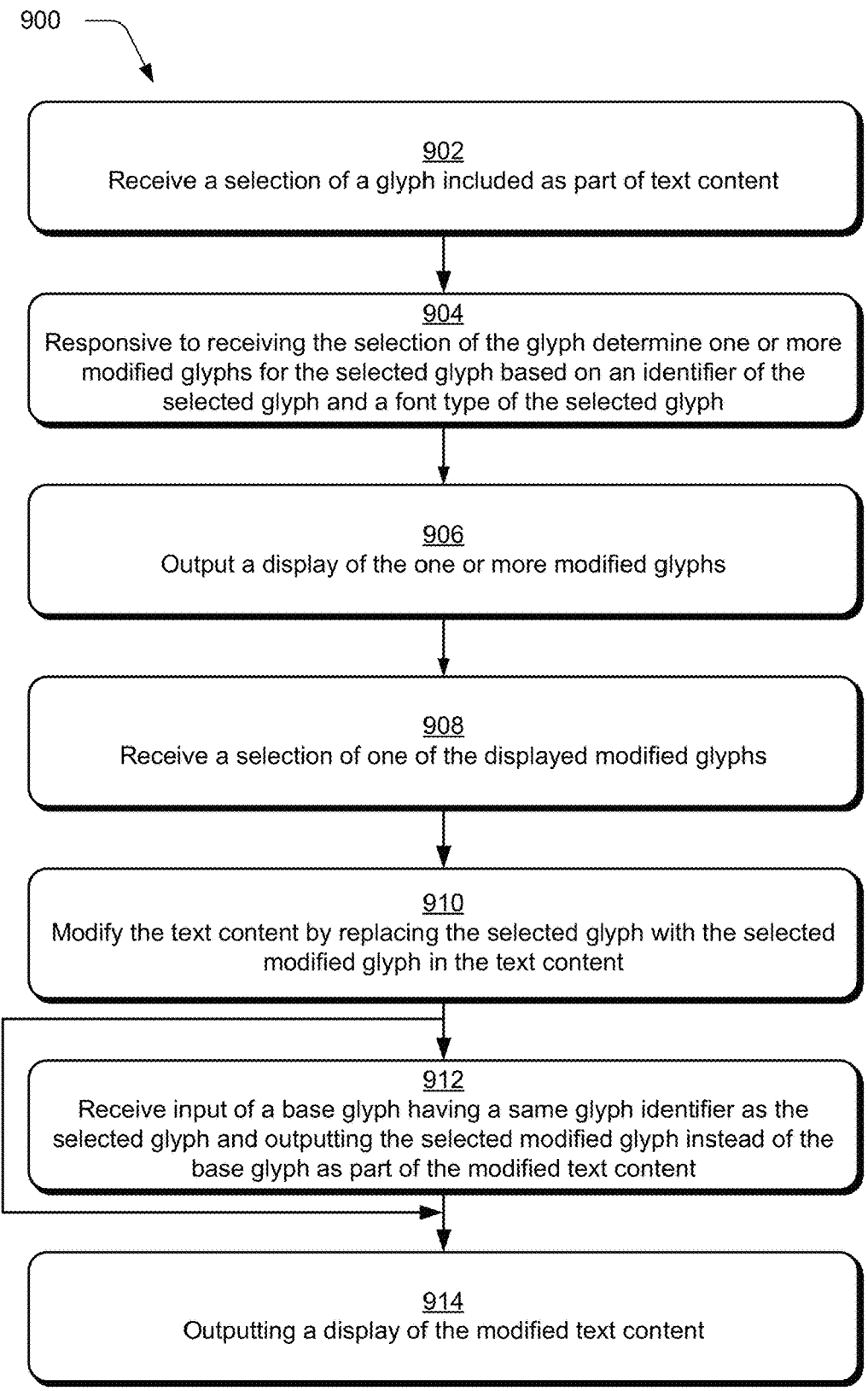
FIG. 9 is a flow diagram depicting a procedure in an example implementation for replacing live text glyphs with glyphs having modified geometries.

FIG. 9 depicts a procedure 900 in an example implementation of live text glyph modifications. A selection of a glyph included as part of text content is received (block 902). The computing device implementing the content processing system 114, for instance, receives glyph selection data 204 selecting a glyph included as part of text content 202.

In response to receiving the selection of the glyph, one or more modified glyphs corresponding to the selected glyphs are determined based on an identifier of the selected glyph and a font type of the selected glyph (block 904). The glyph information module 116, for instance, accesses a data resource in storage 108 of the computing device 102 to retrieve information describing the identifier of the selected glyph and a font type of the selected glyph. The identified glyph(s) are then output for display (block 906). The content editing application 104, for instance, outputs a display at a user interface of alternate glyphs 506, 508, and 510 proximate to the selected glyph 502 and enables selection of one of the alternate glyphs 506, 508, and 510 for use as a modified glyph to be displayed in place of the selected glyph 502.

A selection of one of the displayed modified glyphs is then received (block 808). The content editing application 104, for instance, receives user input selecting one of the alternate glyphs 506, 508, and 510 via user input at the computing device 102. In response to receiving the selection of one of the alternate glyphs, the selected glyph in the text content is replaced with a modified glyph corresponding to the selected one of the alternate glyphs (block 910). The content editing application 104, for instance, generates modified live text 512 or modified live text 514 by replacing the selected glyph 502 with a selected one of the alternate glyphs 506, 508, and 510.

Input of a base glyph having a same glyph identifier as the selected glyph is then received, and the selected modified glyph is output as part of the text content instead of the base glyph (block 912). This step is optional, as indicated by the arrow circumventing block 812. The content editing application 104, for instance, receives a selection of one of the alternate glyphs 506, 508, and 510 to replace an "f" glyph 502 in text content. Responsive to receiving the selection of one of the alternate glyphs 506, 508, and 510, the selected alternate glyph is designated as the preferred geometric appearance of the "f" glyph, such that any "f" glyph subsequently input into the modified live text content 512 is automatically output as having the geometric appearance of the selected alternate glyph. In this manner, a user of the computing device implementing the content editing application 104 need only once designate a modified glyph to use in place of a base glyph when generating modified live text content. A display of the modified text content is then output (block 914). The content editing application 104, for instance, outputs the modified live text content 512 and/or 514 for display at a display device of the computing device 102.

Having described example procedures in accordance with one or more implementations, consider now an example system and device that can be utilized to implement the various techniques described herein.

Example System and Device

Figure 10:
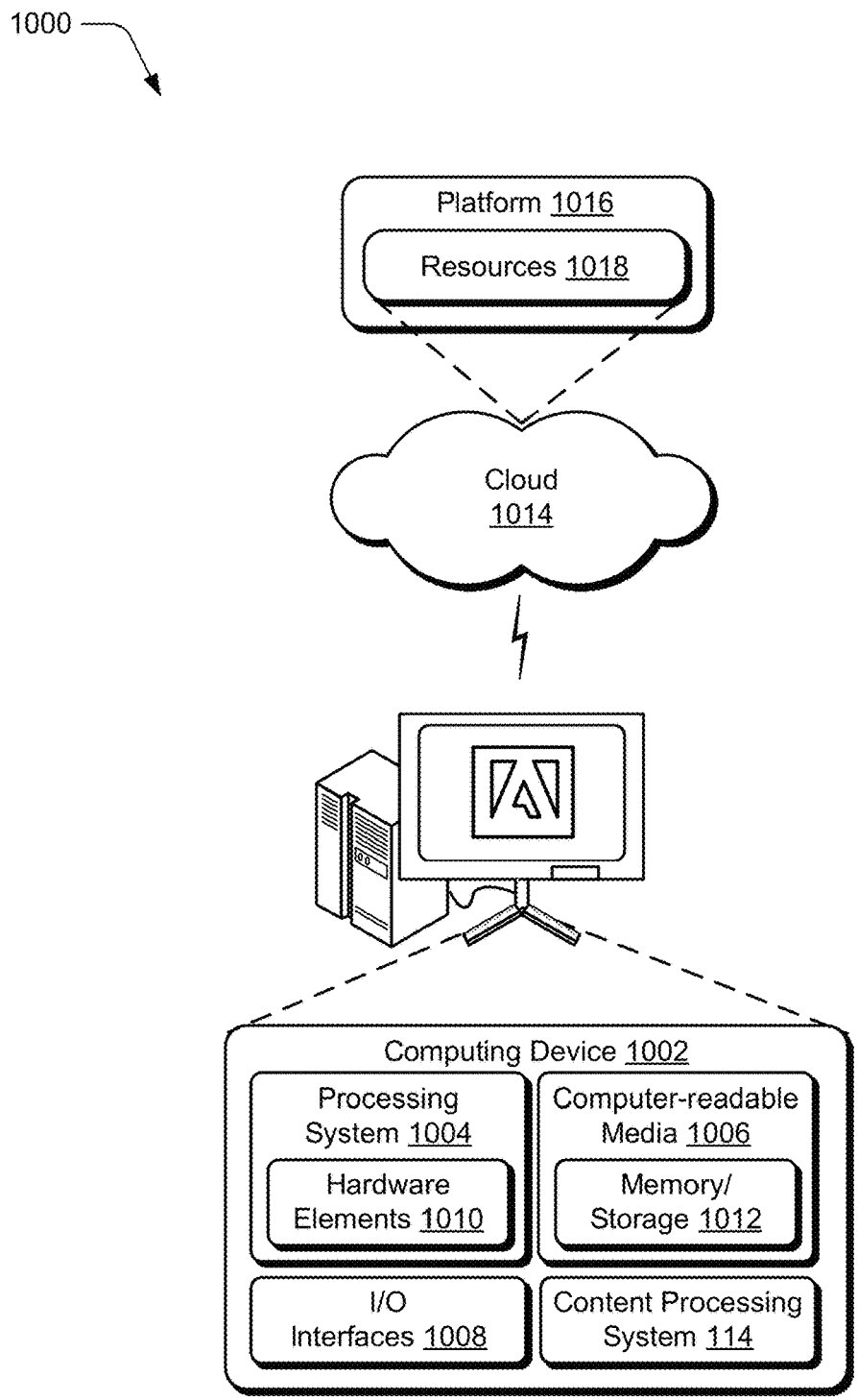
FIG. 10 illustrates an example system including various components of an example device that can be implemented as any type of computing device as described and/or utilized with reference to FIGS. 1-9 to implement embodiments of the techniques described herein.

FIG. 10 illustrates an example system generally at 1000 that includes an example computing device 902 that is representative of one or more computing systems and/or devices that may implement the various techniques described herein. This is illustrated through inclusion of the content processing system 114. The computing device 1002 may be, for example, a server of a service provider, a device associated with a client (e.g., a client device), an on-chip system, and/or any other suitable computing device or computing system.

The example computing device 1002 as illustrated includes a processing system 1004, one or more computer-readable media 1006, and one or more I/O interface 1008 that are communicatively coupled, one to another. Although not shown, the computing device 1002 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1004 is representative of functionality to perform one or more operations using hardware. Accordingly, the processing system 1004 is illustrated as including hardware element 1010 that may be configured as processors, functional blocks, and so forth. This may include implementation in hardware as an application specific integrated circuit or other logic device formed using one or more semiconductors. The hardware elements 1010 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1006 is illustrated as including memory/storage 1012. The memory/storage 1012 represents memory/storage capacity associated with one or more computer-readable media. The memory/storage component 1012 may include volatile media (such as random access memory (RAM)) and/or nonvolatile media (such as read only memory (ROM), Flash memory, optical disks, magnetic disks, and so forth). The memory/storage component 1012 may include fixed media (e.g., RAM, ROM, a fixed hard drive, and so on) as well as removable media (e.g., Flash memory, a removable hard drive, an optical disc, and so forth). The computer-readable media 906 may be configured in a variety of other ways as further described below.

Input/output interface(s) 1008 are representative of functionality to allow a user to enter commands and information to computing device 1002, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1002 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1002. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1002, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1010 and computer-readable media 1006 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1010. The computing device 1002 may be configured to implement particular instructions and/or functions corresponding to the software and/or hardware modules. Accordingly, implementation of a module that is executable by the computing device 1002 as software may be achieved at least partially in hardware, e.g., through use of computer-readable storage media and/or hardware elements 1010 of the processing system 1004. The instructions and/or functions may be executable/operable by one or more articles of manufacture (for example, one or more computing devices 1002 and/or processing systems 1004) to implement techniques, modules, and examples described herein.

The techniques described herein may be supported by various configurations of the computing device 1002 and are not limited to the specific examples of the techniques described herein. This functionality may also be implemented all or in part through use of a distributed system, such as over a "cloud" 1014 via a platform 1016 as described below.

The cloud 1014 includes and/or is representative of a platform 1016 for resources 1018. The platform 1016 abstracts underlying functionality of hardware (e.g., servers) and software resources of the cloud 1014. The resources 1018 may include applications and/or data that can be utilized while computer processing is executed on servers that are remote from the computing device 1002. Resources 1018 can also include services provided over the Internet and/or through a subscriber network, such as a cellular or Wi-Fi network.

The platform 1016 may abstract resources and functions to connect the computing device 1002 with other computing devices. The platform 1016 may also serve to abstract scaling of resources to provide a corresponding level of scale to encountered demand for the resources 1018 that are implemented via the platform 1016. Accordingly, in an interconnected device embodiment, implementation of functionality described herein may be distributed throughout the system 1000. For example, the functionality may be implemented in part on the computing device 1002 as well as via the platform 1016 that abstracts the functionality of the cloud 1014.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. In a digital medium environment to aid graphical design in relation to text content, a method implemented by at least one computing device, the method comprising:
   receiving, by the at least one computing device, a selection of a glyph included as part of text content displayed at a user interface;
   outputting, by the at least one computing device, a display of an outline of the selected glyph at the user interface;
   receiving, by the at least one computing device, input via the user interface modifying a visual appearance of the outline of the selected glyph;
   generating, by the at least one computing device, a modified glyph based on the received input modifying the visual appearance of the outline of the selected glyph, the modified glyph including information describing a base glyph identifier for the modified glyph, a custom glyph identifier for the modified glyph, a font type of the modified glyph, and typographic properties of the modified glyph;
   replacing, by the at least one computing device, the selected glyph with the modified glyph in the text content; and outputting, by the at least one computing device, a display of the text content including the modified glyph at the user interface, the text content and the modified glyph being editable and searchable by a content editing application.

2. The method of claim 1, wherein the input modifying the visual appearance of the outline of the selected glyph comprises input modifying a geometry of the outline of the selected glyph and the modified glyph is generated as having a visual appearance defined by the modified geometry of the outline of the selected glyph.

3. The method of claim 1, wherein the input modifying the visual appearance of the outline of the selected glyph comprises input modifying a position or orientation of a baseline position indicator relative to the outline of the selected glyph, wherein the baseline position indicator designates an alignment for the selected glyphs and one or more different glyphs of the text content.

4. The method of claim 1, wherein the input modifying the visual appearance of the outline of the selected glyph comprises input modifying a position or orientation of a left-bearing position indicator relative to the outline of the selected glyph wherein the left-bearing position indicator designates a distance between the selected glyph and a glyph positioned to the left of the selected glyph in the text content.

5. The method of claim 1, wherein the input modifying the visual appearance of the outline of the selected glyph comprises input modifying a position or orientation of a right-bearing position indicator relative to the outline of the selected glyph, wherein the right-bearing position indicator designates a distance between the selected glyph and a glyph positioned to the right of the selected glyph in the text content.

6. The method of claim 1, the operations further comprising:
determining, by the at least one computing device, a base glyph identifier of the selected glyph and designating the base glyph identifier of the selected glyph as the base glyph identifier for the modified glyph;
determining, by the at least one computing device, the font type of the selected glyph and designating the font type of the selected glyph as the font type of the modified glyph; and
determining, by the at least one computing device, the typographic properties of the modified glyph based on the received input modifying the visual appearance of the outline of the selected glyph.

7. The method of claim 6, the operations further comprising assigning, by the at least one computing device, custom glyph identifier to the modified glyph by determining a maximum glyph identifier for the font type of the selected glyph and incrementing by one.

8. The method of claim 6, wherein the typographic properties of the modified glyph describe a visual appearance of the modified glyph relative to other glyphs of the text content as defined by one or more of a baseline position indicator, a left-bearing position indicator, or a right-bearing position indicator for the selected glyph.

9. A system comprising:
a glyph information module implemented at least partially in hardware of at least one computing device to receive a selection of a glyph included as part of text content displayed at a user interface and determine an identifier of the selected glyph, a font type of the selected glyph, and typographic properties of the selected glyph;
a glyph outline module implemented at least partially in hardware of the at least one computing device to generate an outline of the selected glyph based on the determined identifier of the selected glyph, the font type of the selected glyph, and the typographic properties of the selected glyph and output the generated outline at the user interface;
a glyph modification module implemented at least partially in hardware of the at least one computing device to receive input modifying a visual appearance of the generated outline of the selected glyph via the user interface;
a modified typography module implemented at least partially in hardware of the at least one computing device to generate typographic properties for a modified glyph based on the received input modifying the visual appearance of the generated outline; and
a custom stylesheet module implemented at least partially in hardware of the at least one computing device to:
generate the modified glyph with embedded data describing the identifier of the selected glyph, a custom glyph identifier for the modified glyph, the font type of the selected glyph, and the generated typographic properties for the modified glyph; and
add the modified glyph to a stylistic set for the font type of the selected glyph, the modified glyph of the stylistic set being editable by text editing features of a content editing application.

10. The system of claim 9, wherein the embedded data describing the identifier of the selected glyph and the generated typographic properties for the modified glyph are identifiable by a search feature of the content editing application to return the modified glyph in response to a query for the selected glyph.

11. The system of claim 9, wherein the input modifying the visual appearance of the selected glyph comprises input modifying a position or orientation of a baseline position indicator relative to the outline of the selected glyph, wherein the baseline position indicator designates an alignment for the selected glyphs and one or more different glyphs of the text content.

12. The system of claim 9, wherein the custom stylesheet module is configured to generate the modified glyph without creating a new font or modifying the font type of the selected glyph.

13. The system of claim 9, wherein the modified typography module is configured to automatically generate the typographic properties for the modified glyph by:
performing uniform sampling of the outline of the selected glyph and the modified glyph;
determining a set of points from the sampled outline of the selected glyph corresponding to a baseline position indicator for the selected glyph;
determining a set of points from the sampled modified glyph that correlate to the set of points from the sampled outline of the selected glyph; and
assigning a baseline position indicator to the modified glyph using values assigned to the determined set of points from the sampled modified glyph.

14. The system of claim 9, wherein the stylistic set is useable by a content editing application implemented at least partially in hardware of the at least one computing device to present a selectable option for replacing the selected glyph with the modified glyph in text content.

15. In a digital medium environment to aid graphical design in relation to text content, a method implemented by at least one computing device, the method comprising:

receiving, by the at least one computing device, a selection of a glyph included as part of text content displayed at a user interface;

determining, by the at least one computing device, a base glyph identifier of the selected glyph and a font type of the selected glyph;

responsive to receiving the selection of the glyph, determining, by the at least one computing device, one or more live text modified glyphs available to replace the selected glyph based on the base glyph identifier and the font type of the selected glyph, each of the one or more live text modified glyphs having an associated glyph identifier that is greater than a maximum glyph identifier for the font type of the selected glyph;

outputting, by the at least one computing device, a display of the one or more live text modified glyphs available to replace the selected glyph at the user interface;

receiving, by the at least one computing device, a selection of one of the displayed live text modified glyphs via the user interface;

modifying, by the at least one computing device, the text content by replacing the selected glyph with the selected live text modified glyph in the text content, the modified text content with the selected live text modified glyph remaining editable and searchable by a content editing application; and outputting, by the at least one computing device, a display of the modified text content at the user interface.

16. The method of claim 15, wherein each of the one or more live text modified glyphs is editable with text editing tools, searchable by the content editing application, and exportable to a different file format as recognizable text content.

17. The method of claim 15, wherein outputting the display of the one or more modified glyphs comprises displaying the one or more modified glyphs proximate to the selected glyph in a user interface displaying the text content.

18. The method of claim 15, wherein each of the one or more modified glyphs each include information describing a left-bearing position indicator for the modified glyph, a right-bearing position indicator for the modified glyph, a baseline position indicator for the modified glyph, a geometric outline of the modified glyph, a base glyph identifier to which the modified glyph corresponds, a font type of the base glyph identifier, and a custom glyph identifier that is contiguous with other glyph identifiers for the font type of the base glyph identifier.

19. The method of claim 15, the operations further comprising:

determining, by the at least one computing device, multiple instances of a base glyph corresponding to the selected glyph in the text content; and replacing each of the multiple instances of the base glyph corresponding to the selected glyph with the modified glyph in response to receiving the selection of one of the displayed modified glyphs.

20. The method of claim 15, the operations further comprising:

receiving, by the at least one computing device, textual input of a base glyph corresponding to the selected glyph in the text content after receiving the selection of one of the displayed modified glyphs; and displaying, by the at least one computing device, the selected modified glyph in the text content instead of displaying the base glyph in response to receiving the input of the base glyph.

* * * * *